(12) United States Patent  
Jones

(10) Patent No.: US 6,488,319 B2  
(45) Date of Patent: Dec. 3, 2002

(54) SELF RESTRAINED PRESSURE GASKET

(76) Inventor: Jim Jones, 1108 Los Alamitos Cir., Waco, TX (US) 76706

( * ) Notice: Subject to any disclaimer, the term of this patent is extended or adjusted under 35 U.S.C. 154(b) by 0 days.

(21) Appl. No.: 09/842,945

(22) Filed: Apr. 26, 2001

(65) Prior Publication Data

US 2002/0158466 A1 Oct. 31, 2002

(51) Int. Cl.$^7$ ............ F16L 17/00; F16L 19/00; F16L 21/02
(52) U.S. Cl. ............ 285/374; 285/104; 285/345; 285/349; 285/910
(58) Field of Search ............... 285/345, 349, 285/910, 374, 375, 104, 105; 277/609, 611, 604

(56) References Cited

U.S. PATENT DOCUMENTS 4,662,662 A * 5/1987 Delhaes ............ 285/345
5,094,467 A * 3/1992 Lagabe ............ 285/374
5,295,697 A * 3/1994 Weber et al. ............ 285/105
5,603,530 A * 2/1997 Guest ............ 285/105
5,988,695 A * 11/1999 Corbett, Jr. ............ 264/249

* cited by examiner

Primary Examiner—Lynne H. Browne
Assistant Examiner—Aaron Dunwoody
(74) Attorney, Agent, or Firm—Bracewell & Patterson, LLP

(57) ABSTRACT

A method and apparatus for restraining pipe against internal forces at a pipe or fitting connection and to join and seal at least two pipes to form a pipeline is shown featuring an improved self restrained pressure gasket. The pressure gasket has a rigid ring formed as an integral part of the gasket thus making the gasket easy to install. The rigid ring which forms the restraining mechanism has rows of teeth of varying lengths that, when assembled, engage at various points around the circumference of a mating pipe. The teeth adjust to the tolerances allowed in pipe manufacturing without losing gripping capacity.

14 Claims, 2 Drawing Sheets

SELF RESTRAINED PRESSURE GASKET

BACKGROUND OF THE INVENTION

1. Technical Field

The present invention relates generally to the field of pipe connections, and in particular, to a dual function, self restrained pressure gasket that is usable in a pipe connection.

2. Description of the Related Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

It is well known in the art to extrude plastic pipes in an elongated cylindrical configuration of a desired diameter and to then cut the extruded product into individual lengths of convenient size suitable for handling, shipping and installing. Each length of pipe is enlarged or "belled" at one end sufficiently to join the next adjacent pipe section by receiving in the belled end the unenlarged or "spigot" end of the adjacent length of pipe. The inside diameter of the bell is formed sufficiently large to receive the spigot end of the next section of pipe with sufficient clearance to allow the application of packing, caulking, elastomeric gaskets or other sealing devices designed to prevent leakage at pipe joints when a plurality of pipe lengths are joined to form a pipeline.

During a standard installation of a pipeline, in, for example, municipal installations, the joints between the pipe and the fitting must be restrained to accommodate varying pressures. There are various types of fitting connections which are commercially available and which are used in the waterworks industry. In one type of connection the current restraint mechanism is an external clamping device which is totally separated from the sealing function. Thus, a separate mechanism must perform the sealing function. In the other type of fitting connection, a gasket performs the sealing function. However, it is necessary that an external means must compress the gasket by mechanical action such as T-bolts. Each of these traditional restraining mechanisms adds considerable cost to the pipe installation as well as adding the possibility of human error depending on the specific conditions and applications.

Most current restraining systems offered in the industry require a substantial amount of labor to install. Under most installation conditions, the restraining systems are cumbersome to install and represent a substantial additional effort for the contractor. Also, current products typically require expensive and time-consuming corrosion protection efforts including special coatings, poly-wrapping, special wax tape or adding zinc anode nuts.

Accordingly, there is a need for a cost-effective, easy to manufacture and use mechanism for restraining pipe against internal forces at a pipe or fitting connection and join and seal at least two pipes to form a pipeline. The mechanism must be simple in design, economical to manufacture and dependable in operation.

SUMMARY OF THE INVENTION

It is therefore an object of the present invention to provide an improved self restrained pressure gasket which does not require assembly in the field and which thus simplifies installation.

Another object of the present invention is to provide an improved self restrained pressure gasket that is not subject to external corrosion.

Another object of the present invention is to provide an improved self restrained pressure gasket which is simple in design and dependable in operation.

In the method and apparatus of the invention, an improved self restrained pressure gasket is shown for restraining pipe against internal forces at a pipe or fitting connection and for joining and sealing at least two pipes to form a pipeline. The improved self restrained pressure gasket has the restraining mechanism as an integral part of the gasket thus simplifying field assembly. The preferred restraining mechanism is a stainless steel ring molded or incorporated into the gasket and inserted into a mating groove provided in a belled end opening of the mating female pipe section. The restraining mechanism has rows of teeth of varying length. When a pipe joint is assembled, the teeth engage at various points around the circumference of a mating male section of pipe. The various lengths of teeth adjust to the tolerances allowed in pipe manufacturing without losing gripping capacity. The gasket uses torsion to restrain the pipe and not set screws or wedges. By using torsion to restrain the pipe, point loading and pipe distortion or damage is reduced. Also, since the restraining mechanism is an integral or internal part of the gasket and manufactured of a corrosive resistant material, it is not subject to external corrosion.

The above as well as additional objectives, features, and advantages of the present invention will become apparent in the following detailed written description.

DETAILED DESCRIPTION OF THE PREFERRED EMBODIMENT

Figure 1:
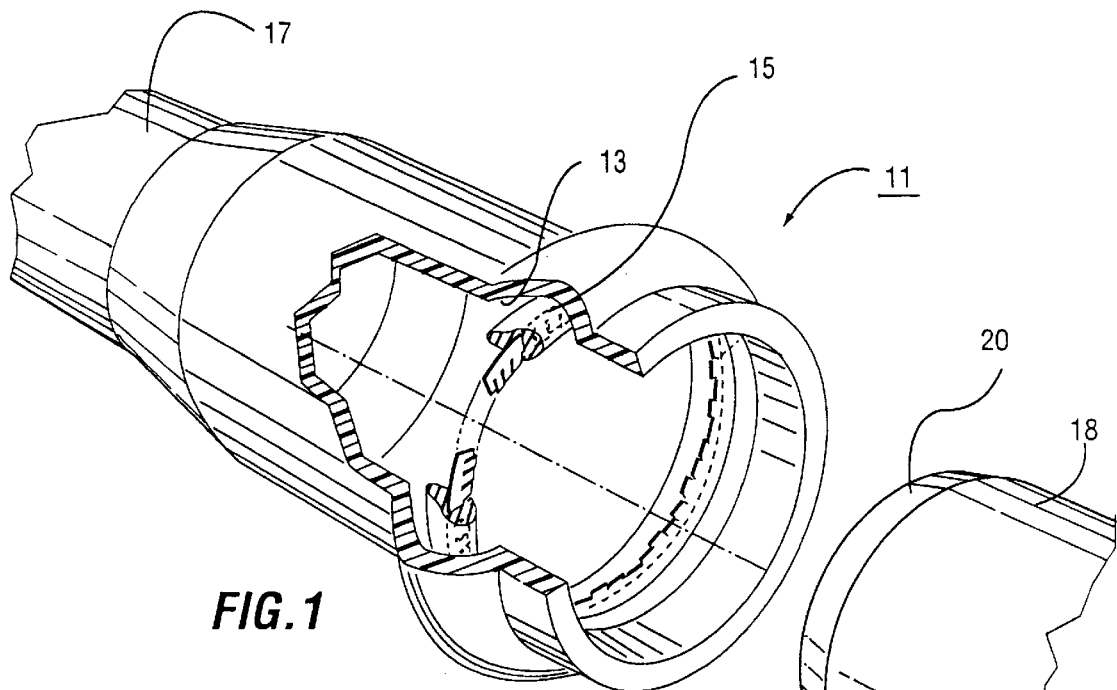
FIG. 1 is a perspective view, partly broken away, of the belled end of a female pipe section showing the self-restrained pressure gasket used in restraining the mating male pipe section against internal forces at a pipe or fitting connection.

Turning to FIG. 1, there is shown an exploded view of a plastic pipe joint in which a belled female pipe end 11 is provided with an annular groove 13 for receiving the self-restrained pressure gasket 15 of the invention. The self-restrained pressure gasket 15 which is inserted within the female belled end opening 12 of the female plastic pipe 17 is capable of joining and sealing the female plastic pipe 17 to a mating male plastic pipe section 18 having a spigot end 20 and having an exterior surface 24 and an interior surface 26. The plastic pipe 17 can be made from any convenient synthetic material including the polyolefins such as polyethylene and polypropylene but is preferably made from polyvinyl chloride (PVC).

Figure 3:
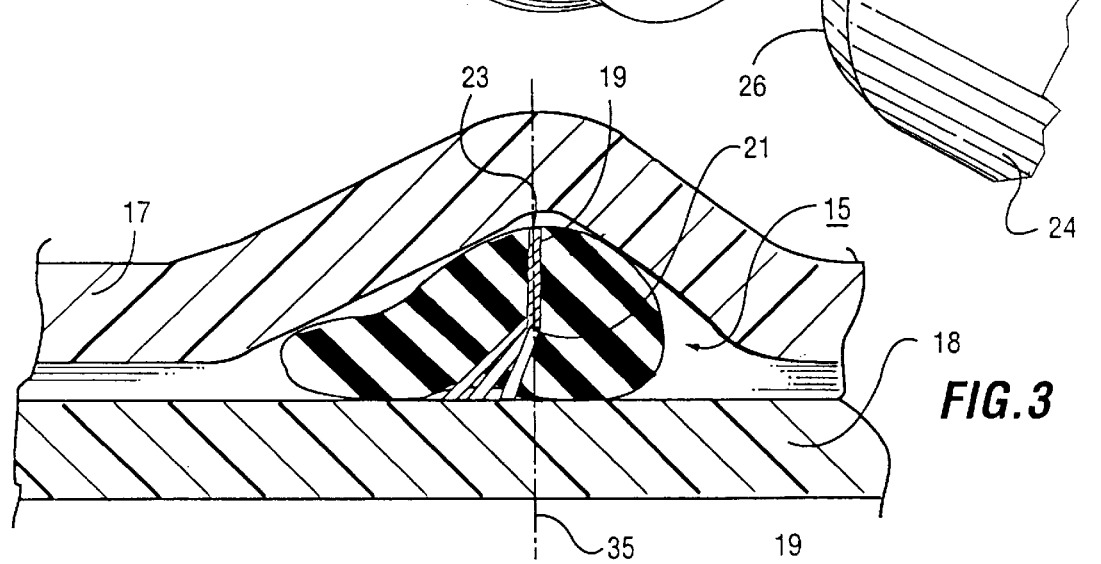
FIG. 3 is an enlarged view of the pipe joint showing the integral steel ring embedded within the rubber of the gasket.
Figure 4:
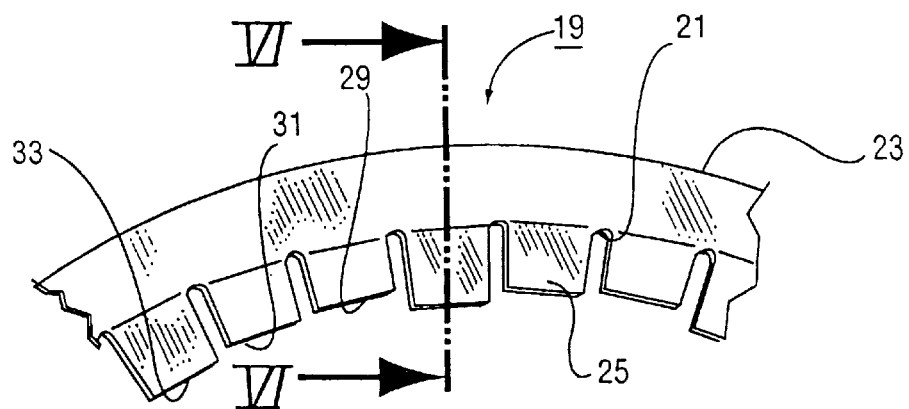
FIG. 4 is a partial, perspective view of the steel ring used in forming the self-restrained pressure gasket.
Figure 5:
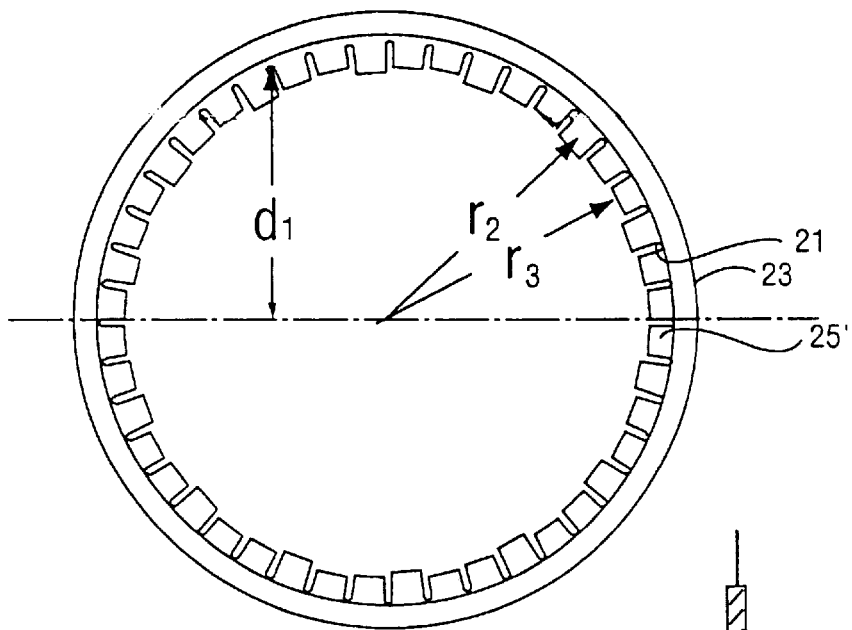
FIG. 5 is an isolated top view of the steel ring used in the self-restrained pressure gasket of the invention.
Figure 6:
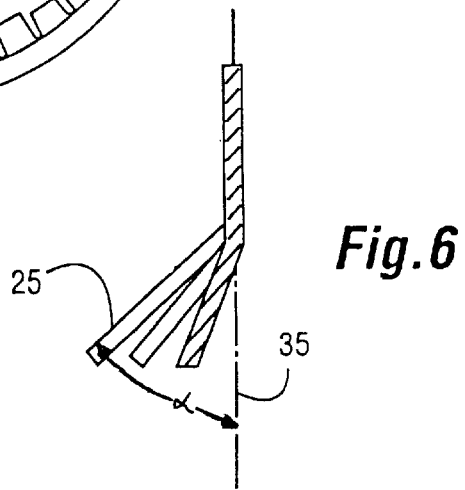
FIG. 6 is a side view of the steel ring of the invention taken along lines VI—VI in FIG. 4.

As best seen in FIG. 3, the self-restrained pressure gasket 15 has an annular gasket body 37 made of a resilient thermoplastic material. The gasket body 37 can be formed, for example, from natural or synthetic rubber or other elastomeric materials. The gasket body 37 has a rigid or hardened ring 19 which is integrally molded within the material of the elastomeric body of the gasket so that the hardened ring 19 is permanently embedded within the resilient thermoplastic material. The hardened ring 19 is preferably of a corrosion resistant metal such as stainless steel but could also be other metallic materials or alloys or even hardened plastic. As best seen in FIGS. 4–6, the hardened ring 19 has an inner circumference 21 and an outer circumference 23 which defines a circumferential hub therebetween. The hardened ring 19 has a plurality of teeth 25 which extend from the inner circumference 21 of the ring for engaging selected points on the exterior surface 18 of the mating male pipe section.

The teeth 25 of the hardened ring 19 are shown in greater detail in FIGS. 4–6. In the embodiment illustrated in FIG. 4, a pair of shorter teeth 29, 31 are separated from a single, relatively longer tooth 33 in a repeating pattern about the inner circumference of the hardened ring. FIG. 5 gives exemplary dimensions for a preferred ring of the invention. As shown in the view of FIG. 5, the distance $d_1$ is approximately 6.2 inches for a hardened ring having an outer circumference of 2.87 inches. The radial length $r_2$ for the longer tooth is approximately 2.33 inches while the radial distance $r_3$ for the shorter tooth is approximately 2.3920 inches.

In addition to being spaced apart in the irregular length pattern illustrated in FIG. 5, the teeth of the hardened ring are also angled away from the central axis (35 in FIG. 6) at an angle "α" of less than 90°.

Figure 2:
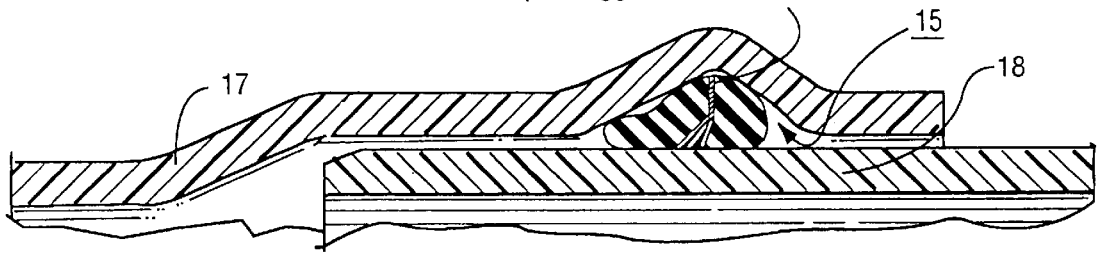
FIG. 2 is a side, cross-sectional view of the improved self-restrained pressure gasket showing the male and female pipe sections being joined to form a secure connection.

FIGS. 2 and 3 illustrate the make-up of a joint of plastic pipe in which the male spigot end 18 is inserted within the belled female pipe section 11. FIG. 2 illustrates the gripping action of the self-restrained pressure gasket 15 in which the teeth 25 grip the exterior surface 24 of the male pipe section 18. The teeth 25 are angled inwardly with respect to the axis 35 so that contact with the male pipe end (18 in FIG. 2) causes the teeth to be deflected in a clockwise direction with respect to axis 35 during the insertion step. Once the male pipe section 18 has been fully inserted, the teeth 25 grip the exterior surface of the male pipe and resist movement in an opposite longitudinal direction. The action is much like a "Chinese finger puzzle" in which the male pipe section 18 can be easily inserted in one direction but which engages the angular teeth 25 of the hardened ring when attempting movement in the opposite longitudinal direction.

An invention has been provided with several advantages. The self-restrained pressure gasket 15 is capable of joining and sealing the female belled end 11 of a plastic pipe to a mating male spigot end 18 of a second plastic pipe. Because the hardened ring 19 is integrally molded within the annular gasket body, the possibility of mistakes during field assembly is virtually eliminated. Because the hardened ring 19 is an integral part of the gasket body, as internal pressure builds, the hardened ring applies more pressure to the exterior surface 24 of the mating male spigot pipe end. This action helps to ensure the integrity of the joint. In addition, the hardened ring 19 aids in sealing the joint by keeping a constant gripping pressure at even the lowest operating pressures of the pipeline.

The plurality of teeth 25 provided on the inner circumference of the hardened ring 19 are oriented to allow movement of the male spigot end 18 in a first longitudinal direction relative to the female belled end 11 but to resist movement in an opposite longitudinal direction. The self-restrained pressure gasket 15 of the invention uses torsion to restrain the pipe and does not rely upon external screws or wedges which can introduce corrosive material into the operating environment. By using torsion to restrain the pipe, point loading and pipe distortion or damage is minimized or eliminated.

As noted with respect to the drawing description, the teeth 25 are of varying lengths and are spaced apart in an irregular pattern. Two shorter teeth are separated by one relatively longer tooth in a repeating pattern around the inner circumference of the ring. The pattern of teeth of varying lengths allow the teeth to adjust to the tolerances allowed in pipe manufacturing without losing gripping capacity as well as allowing different thrust leads generated by different operating pressures in the field. The particular tooth spacing and arrangement creates less stress on the male spigot end 18 of the joint. The plurality of teeth 25 are also angled away from the vertical axis 35 at an angle less than 90° in order to provide the required gripping action to form the joint of pipe.

Because the hardened ring 19 is an integral part of the gasket body 15 and is manufactured of a corrosion resistant material, it is not subject to external corrosion. The self-restraining system of the invention is light weight rather than being bulky and simplifies installation operation in the field. The device is simple in design and economical to manufacture.

While the invention has been shown in only one of its forms, it is not thus limited but is susceptible to various changes and modifications without departing from the spirit thereof.

What is claimed is:

1. A self-restrained pressure gasket for insertion within an annular groove provided in a bell end opening of a female plastic pipe capable of both joining and sealing the female plastic pipe to a mating male plastic pipe having an interior surface and an exterior surface, the gasket comprising:

an annular gasket body made of a resilient thermoplastic material;

a hardened ring integrally molded within the material of the gasket body so that the hardened ring is permanently embedded within the resilient thermoplastic material, the hardened ring having an inner circumference and an outer circumference which define a circumferential hub therebetween, the circumferential hub being substantially enclosed within the thermoplastic material of the gasket body;

a plurality of teeth extending from the inner circumference of the hardened ring for engaging selected points on the exterior surface of the mating male plastic pipe, the teeth having varying lengths and being spaced in an irregular pattern about the inner circumference of the hardened ring; and wherein the male and female pipes are aligned along a central axis and wherein the teeth are angled away from a vertical axis drawn perpendicular to the central axis at an angle less than 90°.

2. The self-restrained pressure gasket of claim 1 wherein the plurality of teeth of varying lengths which are located on the inner circumference of the hardened ring are arranged in a pattern in which a pair of shorter teeth are separated from a relatively longer tooth in a repeating pattern about the circumference thereof.

3. The self-restrained pressure gasket of claim 1 wherein the plastic pipe is made of PVC.

4. The self-restrained pressure gasket of claim 1 wherein the plurality of teeth are made of stainless steel.

5. The self-restrained pressure gasket of claim 1 wherein the plurality of teeth are made of hardened plastic.

6. A pipe joint comprising:

a female plastic pipe having a bell end opening with an annual groove for receiving the male spigot end of a mating plastic pipe;

a self-restrained pressure gasket located within the annular groove provided in the bell end opening of the female plastic pipe capable of both joining and sealing the female plastic pipe to the male plastic pipe, the gasket comprising:

an annular gasket body made of a resilient thermoplastic material;

the annular gasket body having a hardened ring integrally molded within the material of the body of the gasket so that the hardened ring is permanently embedded within the resilient thermoplastic material, the hardened ring having an inner circumference and an outer circumference which define a circumferential hub therebetween, the circumferential hub being substantially enclosed within the thermoplastic material of the gasket body;

the hardened ring having a plurality of teeth extending from the inner circumference of the ring for engaging selected points on the exterior surface of the mating male plastic pipe the teeth having varying lengths and being spaced in an irregular pattern about the inner circumference of the hardened ring; and wherein the male and female pipes are aligned along a central axis and wherein the teeth are angled away from a vertical axis drawn perpendicular to the central axis at an angle less than 90°.

7. The pipe joint of claim 6 wherein the plurality of teeth of varying lengths which are located on the inner circumference of the hardened ring are arranged in a pattern in which a pair of shorter teeth are separated from a relatively longer tooth in a repeating pattern about the circumference thereof.

8. The pipe joint of claim 6 wherein the plastic pipe is made of PVC.

9. The pipe joint of claim 6 wherein the plurality of teeth are made of stainless steel.

10. The pipe joint of claim 6 wherein the plurality of teeth are made of hardened plastic.

11. Method of joining and sealing a female plastic pipe to a mating male plastic pipe comprising:

providing an annular gasket having a hardened ring integrally molded within a body made of a resilient thermoplastic material wherein the hardened ring has a plurality of teeth extending from an inner circumference of the ring for engaging selected points on an exterior surface of the mating male plastic pipe, the teeth having varying lengths and being spaced in an irregular pattern about the inner circumference of the hardened ring;

inserting the gasket body into an annular grove provided within a bell end opening of the female plastic pipe;

inserting the mating male plastic pipe into the bell end opening of the female plastic pipe with the male and female pipes being aligned along a central axis with the teeth being angled away from a vertical axis drawn perpendicular to the central axis at an angle less than 90°, such that the gasket body both joins and seals the female plastic pipe to the mating male plastic pipe, the teeth of the annular gasket being forced into engagement with the exterior surface of the male plastic pipe, the teeth being oriented to allow movement of the male pipe in a first direction relative to the female bell end opening but to resist movement in a opposite direction.

12. The method of claim 11 wherein the plurality of teeth of varying lengths which are located on the inner circumference of the hardened ring are arranged in a pattern in which a pair of shorter teeth are separated from a relatively longer tooth in a repeating pattern about the circumference thereof.

13. The method of claim 11 wherein the plastic pipe is made of PVC.

14. The method of claim 11 wherein the plurality of teeth are made of stainless steel.

\* \* \* \* \*